US010002380B2

United States Patent
Woo

(10) Patent No.: US 10,002,380 B2
(45) Date of Patent: Jun. 19, 2018

(54) BEACON SERVICE METHOD AND DEVICE

(71) Applicant: SK PLANET CO., LTD., Gyeonggi-do (KR)

(72) Inventor: Jong Won Woo, Incheon (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 84 days.

(21) Appl. No.: 14/795,310

(22) Filed: Jul. 9, 2015

(65) Prior Publication Data

US 2016/0012517 A1    Jan. 14, 2016

(30) Foreign Application Priority Data

Jul. 9, 2014   (KR) .................. 10-2014-0086103
Aug. 4, 2014   (KR) .................. 10-2014-0100046
Sep. 3, 2014   (KR) .................. 10-2014-0117210

(51) Int. Cl.
*G06Q 30/00*   (2012.01)
*G06Q 30/06*   (2012.01)
*H04W 4/00*   (2018.01)
*G06Q 30/02*   (2012.01)
*H04W 4/02*   (2018.01)
(Continued)

(52) U.S. Cl.
CPC ..... *G06Q 30/0639* (2013.01); *G06Q 30/0251* (2013.01); *G06Q 30/0255* (2013.01); *G06Q 30/0261* (2013.01); *G06Q 30/0272* (2013.01); *G06Q 30/0601* (2013.01); *H04H 20/61* (2013.01); *H04W 4/008* (2013.01); *H04W 4/02* (2013.01); *H04W 4/021* (2013.01); *H04W 4/023* (2013.01); *H04W 48/16* (2013.01);
(Continued)

(58) Field of Classification Search
CPC ....... H04W 4/023; H04W 4/02; H04W 4/021; H04W 60/00; H04W 60/04; H04W 64/003; H04W 76/025; H04W 48/16; G06Q 30/06; G06Q 30/02; G06Q 30/0241; G06Q 30/0601–30/0645; G06Q 30/0261; G06Q 30/0251; G06Q 30/0267; G06Q 30/0272; G06Q 30/0639
USPC ............. 705/26.1–27.2, 14.49, 14.53, 14.57, 705/14.58, 14.64, 14.68; 455/95, 103
See application file for complete search history.

(56) References Cited

U.S. PATENT DOCUMENTS

2011/0295612 A1* 12/2011 Donneau-Golencer  G06Q 30/02
                                                    705/1.1
2014/0164513 A1*  6/2014 Lieb ........................ H04L 67/26
                                                    709/204
(Continued)

OTHER PUBLICATIONS

Miles, Stephanie. 8 Tools to Send Messages to Shoppers Based on In-Store Movements. Apr. 21, 2014 (Apr. 21, 2014). Accessed via: http://streetfightmag.com/2014/04/21/8-tools-to-send-messages-to-shoppers-based-on-in-store-movements/.*

*Primary Examiner* — Resha Desai
*Assistant Examiner* — Allison G Wood
(74) *Attorney, Agent, or Firm* — Fenwick & West LLP

(57) ABSTRACT

Disclosed herein are a beacon service method, and a device and a sever employed by the method. Contents information associated with a shop that a user is visiting is provided to the user by using only a beacon signal transmitted from the shop. For providing a beacon service, contents are filtered, so that only useful contents are displayed. In addition, a user terminal carried by a user is prompted to output a beacon signal, so that a nearby user terminal having recognized the beacon signal may be provided with location-based contents.

15 Claims, 16 Drawing Sheets

(51) Int. Cl.
| | |
|---|---|
| *H04W 60/00* | (2009.01) |
| *H04W 64/00* | (2009.01) |
| *H04W 76/02* | (2009.01) |
| *H04W 48/16* | (2009.01) |
| *H04H 20/61* | (2008.01) |
| *H04W 60/04* | (2009.01) |

(52) U.S. Cl.
CPC ........... *H04W 60/00* (2013.01); *H04W 60/04* (2013.01); *H04W 64/003* (2013.01); *H04W 76/025* (2013.01)

(56) References Cited

U.S. PATENT DOCUMENTS

| | | | |
|---|---|---|---|
| 2014/0219118 A1* | 8/2014 | Middleton | G06Q 30/0261 370/252 |
| 2015/0039462 A1* | 2/2015 | Shastry | G06Q 30/0633 705/26.7 |

* cited by examiner

BEACON SERVICE METHOD AND DEVICE

CROSS-REFERENCE TO RELATED APPLICATIONS

This application is based upon and claims the benefit of priority from Korean Patent Application No. 10-2014-0086103, filed on Jul. 9, 2014, Korean Patent Application No. 10-2014-0100046, filed on Aug. 4, 2014, and Korean Patent Application No. 10-2014-0117210, filed on Sep. 3, 2014, the entire contents of which are incorporated herein by reference.

TECHNICAL FIELD

The present disclosure relates to a technique for providing a user with contents information associated with a shop that she/he is visiting using only a beacon signal transmitted from the shop.

The present disclosure also relates to a technique for filtering contents so that only contents that is useful to a user is displayed for providing a beacon service.

In addition, the present disclosure relates to a technique for prompting a user terminal carried by a user to output a beacon signal so as to provide a nearby user terminal, which has recognized the beacon signal, with location-based contents.

BACKGROUND

Bluetooth low energy (BLE) is a technology intended to perform Bluetooth communication at reduced power and is attracting attention recently.

As one of applications utilizing BLE technology, there is a beacon service that provides shop/product information using a BLE transmitter.

In a beacon service, a plurality of service relays (e.g., Bluetooth beacon transmitters) may be installed adjacent to one another in a short-range wireless communication environment. Often, too much information is displayed to users and may bother them. Accordingly, it is necessary to control the amount of provided information appropriately.

As the number of users using beacon services increases, more shops join them for their marketing and promotion. Accordingly, the amount of contents received by user terminals also increases.

In this connection, contents that are received by a user terminal via a beacon service are automatically displayed to a user without any operation after a beacon signal is recognized. Such contents displayed automatically may bother users.

In view of above, in order to improve service quality of beacon services, aggressive filtering on contents is required that allows only contents that are useful to users to be displayed.

In addition, beacon services may provide a location-based service that provides local information, shop information, product information, etc., appropriate for the location of a user terminal by utilizing the location information of the user terminal.

To this end, a beacon service requires a beacon terminal transmitting a short-range wireless signal conforming to the Bluetooth specification, for example, to be located in each shop. If a user terminal enters a shop, it recognizes the beacon signal and transmits related information to a service server. Then, the service server recognizes the location information of the user terminal, to thereby provide contents appropriate for the location.

Since every shop has a beacon terminal, however, there is a burden of high cost for installing and maintaining beacon devices such as fixing the beacon devices, replacing batteries, etc.

In addition, as the coverage of a beacon signal output from a beacon terminal installed in a shop is limited to the inside or vicinity of the shop, it is not possible to provide potential customers with information associated with the shop until they approaches the shop.

SUMMARY

In view of the above, an object of the present disclosure is to provide a user with contents information associated with a shop that she/he is visiting using only a beacon signal transmitted from the shop.

Another object of the present disclosure is to filter contents so that only contents that is useful to a user is displayed for providing a beacon service.

Yet another object of the present disclosure is to prompt a user terminal carried by a user to output a beacon signal so as to provide a nearby user terminal, which has recognized the beacon signal, with location-based contents.

According to one embodiment of the present disclosure, provided is a user terminal including: a signal receiving unit configured to receive a plurality of beacon signals; a signal selecting unit configured to select one of the plurality of beacon signals that includes identification information of a shop, if it is checked that a user has entered the shop based on intensities of the plurality of beacon signals; and an information displaying unit configured to display contents information if the selected beacon signal contains the contents information.

The selected beacon signal may include at least one of a first beacon signal used for checking if the user has entered the shop by the intensities, and a second beacon signal containing identification information of the shop.

The user terminal may further include: a communication unit configured to transmit approach information for the beacon terminal sending out the selected beacon signal to a service server if the selected beacon signal contains no content information, and receive the contents information created based on the approach information from the service server; and a control unit configured to control so that the contents information is displayed only when usefulness index for the beacon terminal is equal to or larger than a threshold value.

The usefulness index may be determined based on at least one of a time period for which the contents information is displayed to the user and whether the user inputs a predetermined operation after the contents information is displayed.

According to another embodiment of the present disclosure, provided is a service server including: a beacon request transmitting unit configured to transmit a request to output a beacon signal to a beacon terminal to have the beacon terminal to output a beacon signal, if it is determined that the beacon terminal has entered a predetermined area based on location information received from the beacon terminal; an approach information receiving unit configured to receive approach information recognized from the beacon signal from a user terminal that has recognized the beacon signal;

and a contents providing unit configured to provide the user terminal with contents extracted based on the approach information.

If there is shop information that is matched to the predetermined area that the beacon terminal has entered, the beacon request transmitting unit may transmit the request to output a beacon signal such that the beacon terminal outputs the beacon signal containing information related to the shop information.

According to another embodiment of the present disclosure, provided is a method of operating a user terminal, the method including: receiving a plurality of beacon signals; selecting one of the plurality of beacon signals that includes identification information of a shop, if it is checked that a user has entered the shop based on intensities of the plurality of beacon signals with one another; and displaying contents information if the selected beacon signal contains the contents information.

The selected beacon signal may include at least one of a first beacon signal used for checking if the user has entered the shop based on the intensities, and a second beacon signal containing identification information of the shop.

The method may further include: transmitting approach information for the beacon terminal sending out the selected beacon signal to a service server if the selected beacon signal contains no content information, and receiving the contents information created based on the approach information from the service server; and controlling so that the contents information is displayed only when usefulness index for the beacon terminal is equal to or larger than a threshold value.

The usefulness index may be determined based on at least one of a time period for which the contents information is displayed to the user and whether the user inputs a predetermined operation after the contents information is displayed.

According to another embodiment of the present disclosure, provided is a method of operating a service server, the method including: transmitting a request to output a beacon signal to a beacon terminal to have the beacon terminal to output a beacon signal, if it is determined that the beacon terminal has entered a predetermined area based on location information received from the beacon terminal; receiving approach information recognized from the beacon signal from a user terminal that has recognized the beacon signal; and providing the user terminal with contents extracted based on the approach information.

If there is shop information that is matched to the predetermined area that the beacon terminal has entered, the transmitting may include transmitting the request to output a beacon signal such that the beacon terminal outputs the beacon signal containing information related to the shop information.

According to the beacon service method and the device and sever employed by the method, beacon signals from adjacent shops are filtered, so that a customer who is visiting a shop providing information such as coupons, etc., via a beacon signal is expected to stay longer at the shop. Accordingly, it is possible to attract the customer's attention to the visited shop, expecting increase in sales.

In addition, according to the beacon service method and the device and sever employed by the method, a user terminal, a service server and a method of filtering contents information, in which it is determined whether contents information is useful to a user by inferring the user's intention, so that only useful contents information is displayed on the user's terminal.

Further, according to the beacon service method and the device and sever employed by the method, a user terminal carried by a user is prompted to output a beacon signal, and if a nearby user terminal recognizes the beacon signal, the user terminal can be provided with location-based contents. As a result, an owner of a shop has an advantage in that no beacon device is required to be installed in the shop, and beacon signals can reach more broadly.

DETAILED DESCRIPTION

A first exemplary embodiment of the present disclosure will be described with reference to FIGS. 1 to 3, in which a user is provided with contents information associated with a shop that she/he is visiting using only a beacon signal transmitted from the shop.

Figure 1A:
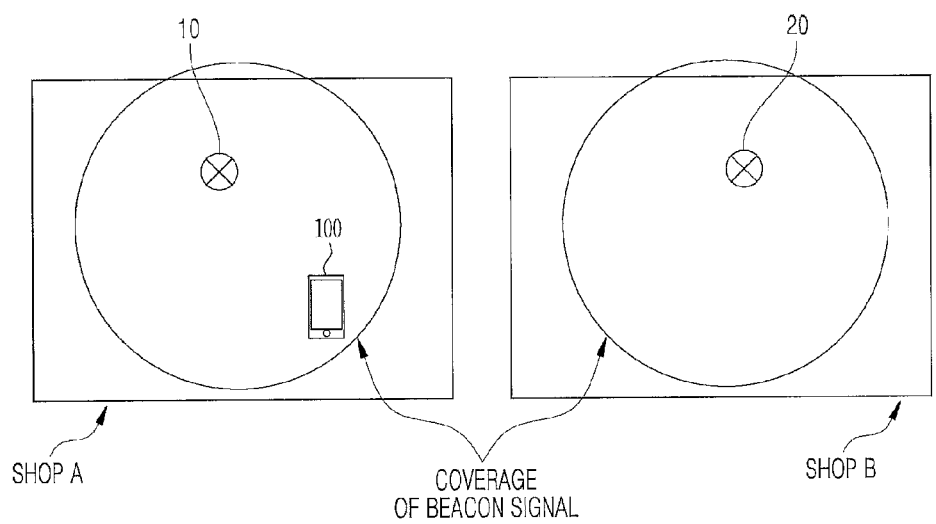
FIGS. 1A to 1C are conceptual diagrams for illustrating a beacon service system according to a first exemplary embodiment of the present disclosure.
Figure 1B:
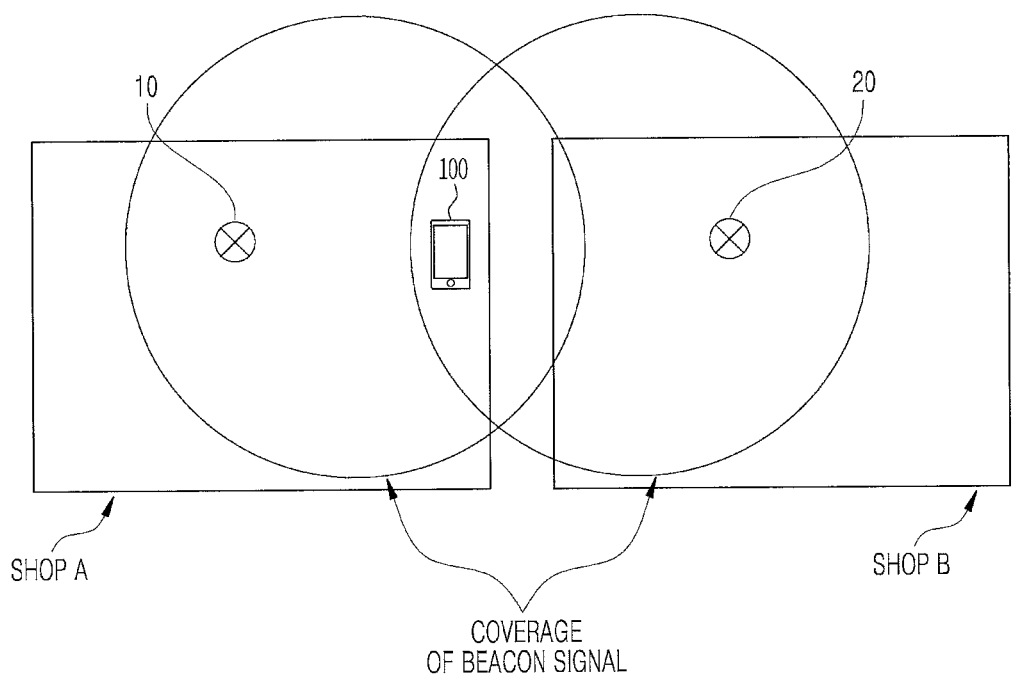
Figure 1C:
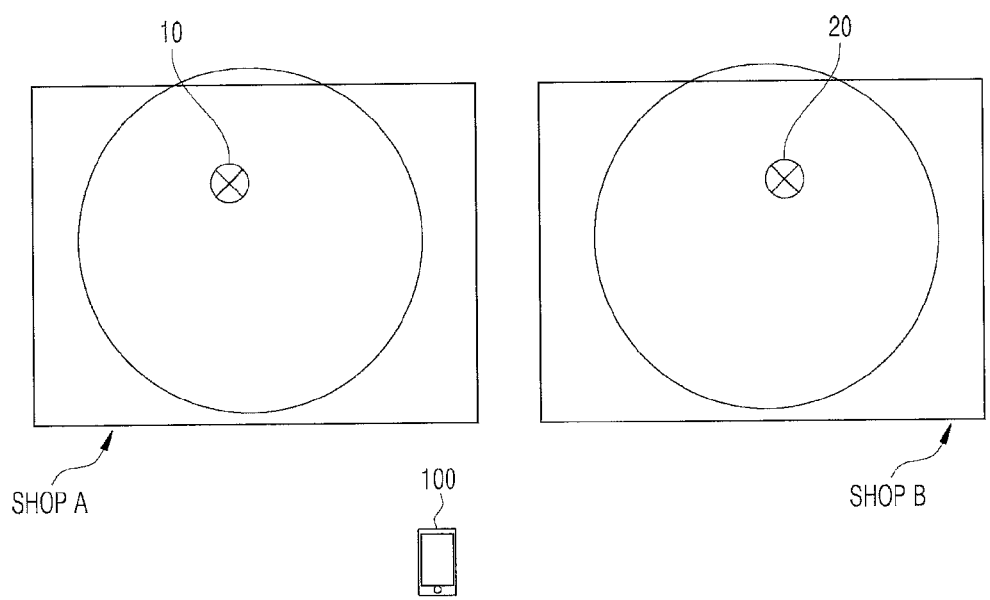

FIGS. 1A to 1C are conceptual diagrams for illustrating a beacon service system according to the first exemplary embodiment of the present disclosure.

The beacon service system may include beacon terminals 10 and 20, and a user terminal 100.

The beacon terminals 10 and 20 are connected to the beacon service system and provide a variety of shop information items (e.g., products for sale, price information, events, coupons, etc.) associated with a shop that a user passes by or visits to the user's terminal 100.

The beacon terminals 10 and 20 may transmit the shop information items via a beacon signal conforming to a communication protocol such as Bluetooth, Zigbee, Wi-Fi, etc. In the following descriptions, the beacon terminals 10 and 20 are BLE (Bluetooth low energy) beacon terminals.

Referring to FIG. 1A, in the beacon service system according to the first exemplary embodiment of the present disclosure, a BLE beacon device that sends out product/sale information associated with each shop is installed at a predetermined location thereof.

As shown in the drawings, a beacon terminal 10 for providing information associated with shop A is installed in shop A, and a beacon terminal 20 for providing information associated with shop B is installed in shop B.

Each of the beacon terminals 10 and 20 has a coverage as shown in FIG. 1A. A signal sent out from each of the beacon terminals 10 and 20 has to have an intensity of a certain degree so that it can be sensed by a mobile terminal of a customer when the customer (who carries the mobile terminal) has visited the shop.

The user's terminal 100 senses a beacon signal when it enters the coverage of the beacon terminal 10 or 20, and receives shop information, sale information, etc., transmitted via the beacon signal.

The operations of the user terminal 100 will be described in detail below.

The beacon signal sent out from each of the beacon terminals may include a beacon signal (first beacon signal) indicative of whether a shop exists around a user, and a beacon signal (second beacon signal) containing identification information to identify the shop from others.

If a single beacon terminal sends out the first and second beacon signals, the first beacon signal and the second beacon signal may be distinguished one from another based on their radio frequencies or sending timings. If different beacon terminals send out the first and second beacon signals, the first and second beacon signals can be distinguished one from another using universally unique identifiers (UUIDs) specific to beacon terminals.

In addition, the value of a "minor" field of the first beacon signal (the beacon signal used for sensing entering/leaving a shop) may be set to 0.

In this instance, the user terminal 100 may sense entering a shop based on a beacon signal whose "minor" field is set to 0 among a plurality of beacon signals.

If there are multiple beacon signals whose "minor" fields are set to 0, the user terminal 100 selects, as the first beacon signal, one of the multiple beacon signals that is transmitted from the closest location.

In other words, the user terminal 100 compares intensities of the signals with one another and determines a signal having the strongest intensity as the signal for sensing entering a shop.

The user terminal 100 displays the information associated with the shops received via the first and second beacon signals to the user.

That is, the user terminal 100 receives, from the beacon terminal in the shop that is determined as being visited by the user via the first beacon signal, contents information such as product information, sale information, coupon information, etc., received via the second beacon signal to display the user via display means.

In doing so, the user terminal 100 handles the beacon signal from the store (selected by the second beacon signal) separately from beacon signals from other shops That is, the user terminal 100 handles only the beacon signal sent out from the shop that the user is visiting and displays it to the user, and handles beacon signals (e.g., a beacon signal not containing identification information of the visited shop) from other shops separately and dose not display it to the user.

The operation will be described with reference to FIG. 1B. If the user terminal 100 that is determined as entering shop A receives a beacon signal from the beacon terminal 20 in shop B, the user terminal 100 does not display information on shop B transmitted via the beacon signal.

For example, the user terminal 100 stores a beacon signal from shop B in a queue and display it to the user when it is sensed that the user has left shop A.

By performing such filtering, the user receives only a beacon signal from a shop that she/he is visiting and thus can focus on the information that the shop provides.

Since beacon signals from other shops are not provided to a visitor, the visitor may stay longer at a shop that provides coupon information, etc. Accordingly, the owner of the shop can expect increase in sales.

If the user leaves the shop so that the user terminal 100 cannot receive the beacon signal from the shop as shown in FIG. 1C, the user terminal 100 is operable to receive and handle beacon signals from other shops.

In addition, the user terminal 100 may display to the customer a beacon signal from another shop stored in the queue while she/he was visiting shop A.

Figure 2:
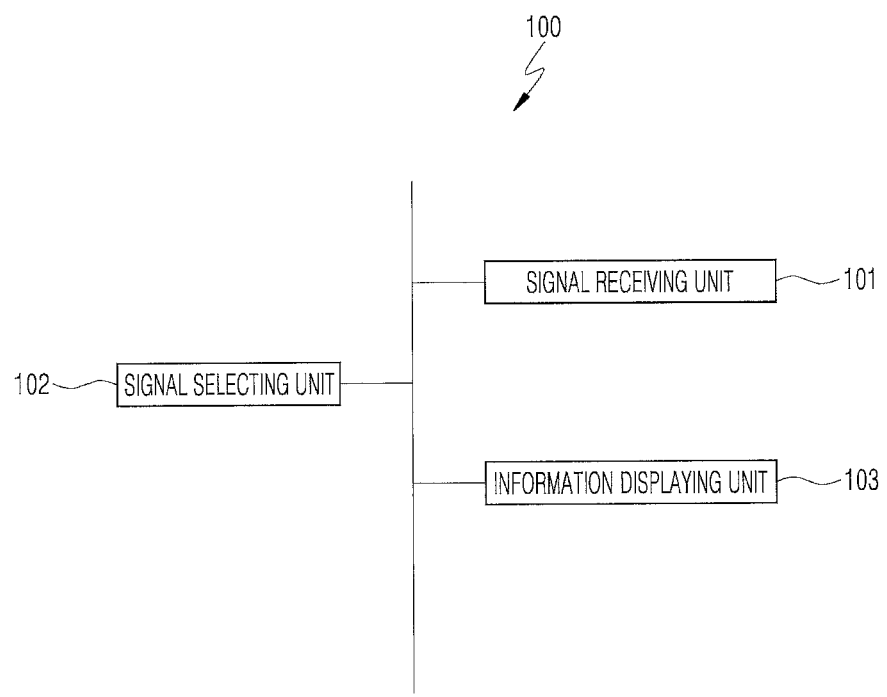
FIG. 2 is a block diagram of a user terminal according to the first exemplary embodiment of the present disclosure.

FIG. 2 is a block diagram of the user terminal according to the first exemplary embodiment of the present disclosure.

The user terminal 100 may sense entering/leaving a shop by receiving a beacon signal such as Bluetooth, Zigbee, Wi-Fi signals, etc, and may receive a variety of information items from shops transmitted via beacon signals to display them to the user.

In addition, the user terminal 100 may handle only the beacon signal sent out from the shop that the user is visiting to display it to the user, and handle a beacon signal from another shop separately not to display it to the user.

The user terminal 100 may include a signal receiving unit 101, a signal selecting unit 102, and an information displaying unit 103. The user terminal 100 may further include a storage unit, for example.

The signal receiving unit 101 may receive a first beacon signal indicative of whether a shop exists around a user, and a second beacon signal containing identification information of the shop.

The first and second beacon signals may be BLE-based beacon signals.

If a single beacon terminal sends out the first and second beacon signals, the first beacon signal and the second beacon signal may be distinguished one from another based on their radio frequencies or sending timings. If different beacon terminals send out the first and second beacon signals, the first and second beacon signals can be distinguished one from another using UUIDs specific to beacon terminals.

In addition, the "minor" field of the first beacon signal may be set to 0. If the signal receiving unit 101 receives multiple beacon signals whose "minor" fields are set to 0, the signal receiving unit 101 may select, as the first beacon signal, one of the multiple beacon signals that is transmitted from the closest location.

That is, the signal receiving unit 101 compares intensities of the signals with one another and determines a signal having the strongest intensity as the signal for sensing entering a shop.

The signal selecting unit 102 may separate the beacon signal received from the shop (distinguished by the second beacon signal) from beacon signals received from other shops.

The signal selecting unit 102 may store beacon signals from other shops in a predetermined queue.

The information displaying unit 103 may display the information associated with the shops received via the first and second beacon signals to the user.

That is, the information displaying unit 102 receives, from the beacon terminal in the shop that is determined as being visited by the user via the first beacon signal, contents information such as product information, sale information, coupon information, etc., received via the second beacon signal to display the user via display means.

If no first beacon signal is received, i.e., it is sensed that a user has left a shop, the information displaying unit 103 may display information associated with the other shops red via the beacon signals separately handled.

That is, if the user leaves the shop so that the user terminal 100 cannot receive the beacon signal from the shop as shown in FIG. 1C, the information displaying unit 103 may notify the customer of beacon signals from the other shops stored in the queue while visiting shop A.

Figure 3:
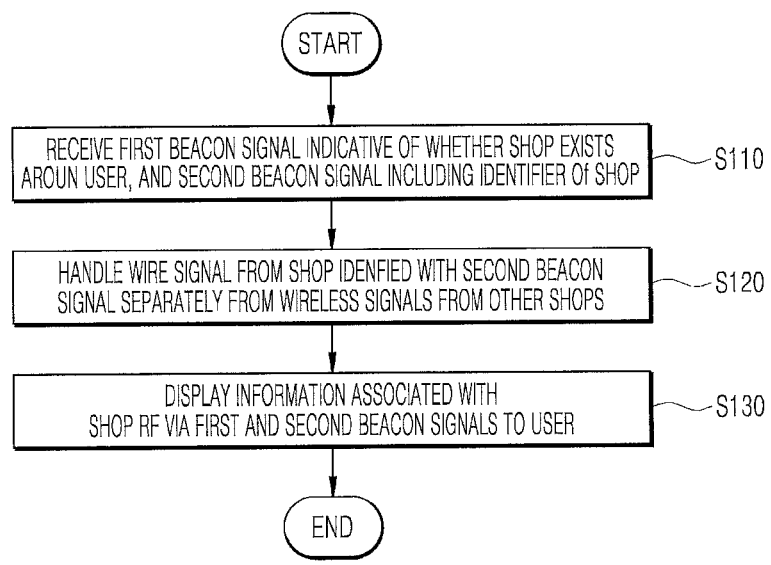
FIG. 3 is a flowchart for illustrating a method of displaying contents information by the user terminal according to the first exemplary embodiment of the present disclosure.

FIG. 3 is a flowchart for illustrating a method of displaying information by the user terminal 100 according to the first exemplary embodiment of the present disclosure.

The method described below may be carried out the user terminal 100 and the beacon service system described above with respect to FIGS. 1 and 2.

The user terminal 100 may sense entering/leaving a shop by receiving a beacon signal such as Bluetooth, Zigbee, Wi-Fi signals, etc., and may receive a variety of information items from shops transmitted via beacon signals to display them to the user.

In addition, the user terminal 100 may handle only the beacon signal sent out from the shop that the user is visiting to display it to the user, and handle a beacon signal from another shop separately not to display it to the user.

The user terminal 100 may receive a first beacon signal indicative of whether a shop exists around a user, and a second beacon signal containing identification information of the shop.

The first and second beacon signals may be BLE-based beacon signals.

If a single beacon terminal sends out the first and second beacon signals, the first beacon signal and the second beacon signal may be distinguished one from another based on their radio frequencies or sending timings.

If different beacon terminals send out the first and second beacon signals, the first and second beacon signals can be distinguished one from another using UUIDs specific to beacon terminals.

In addition, the "minor" field of the first beacon signal may be set to 0. If the signal receiving unit 100 receives multiple beacon signals whose "minor" fields are set to 0, the user terminal 100 may select, as the first beacon signal, one of the multiple beacon signals that is transmitted from the closest location.

In other words, the user terminal 100 compares intensities of the signals with one another and determines a signal having the strongest intensity as the signal for sensing entering a shop.

The user terminal 100 may separate the beacon signal received from the shop (distinguished by the second beacon signal) from beacon signals received from other shops.

The user terminal 100 may store beacon signals from other shops in a predetermined queue.

The user terminal 100 may display the information associated with the shops received via the first and second beacon signals to the user.

That is, the user terminal 100 receives, from the beacon terminal in the shop that is determined as one the user has entered by the first beacon signal, contents information such as product information, sale information, coupon information, etc., received via the second beacon signal to display the user via display means.

If no first beacon signal is received, i.e., it is sensed that a user has left a shop, the user terminal 100 may display information associated with the other shops red via the beacon signals separately handled.

That is, if the user leaves the shop so that the user terminal 100 cannot receive the beacon signal from the shop as shown in FIG. 1C, the user terminal 100 may notify the customer of beacon signals from the other shops stored in the queue while visiting shop A.

A second exemplary embodiment of the present disclosure will be described with reference to FIGS. 4 to 8, in which contents are filtered so that only useful information is displayed to a user.

Figure 4:
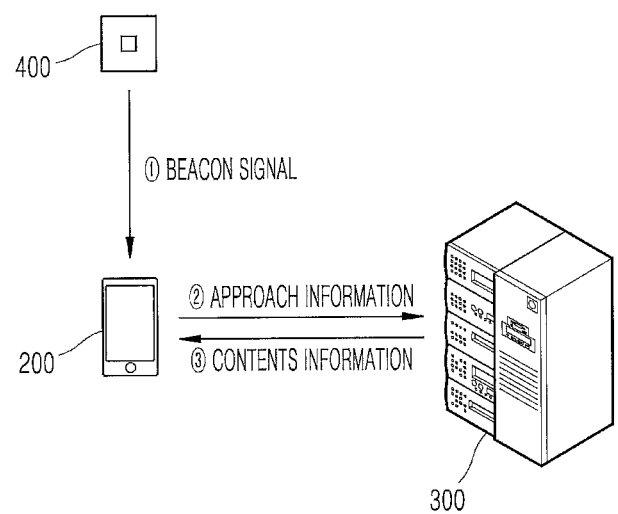
FIG. 4 is a view schematically showing a beacon service system according to a second exemplary embodiment of the present disclosure.

FIG. 4 is a view schematically showing a beacon service system according to the second exemplary embodiment of the present disclosure.

As shown in FIG. 4, the beacon service system according to the second exemplary embodiment of the present disclosure may include a beacon terminal 400, a user terminal 200 and a service server 300. As shown in FIG. 4, a beacon signal output from the beacon terminal 400 may be received by the user terminal 200, the user terminal 200 may provide the service server 300 with approach information associated with the beacon terminal 400, and the service server 300 may select appropriate contents based on the approach information to provide it to the user.

The second exemplary embodiment of the present disclosure is based on the technical idea that only contents of high usefulness is output to the user terminal 200. Among the features of devices for implementing a beacon service, ones already known in the art will be omitted.

The beacon terminal 400 may be located at a location in a shop. A plurality of beacon terminals may be located in a shop.

The beacon terminal 400 outputs a beacon signal containing its identification information. The identification information may include a unique user identifier (UUID) of the beacon terminal 400.

The beacon signal may conform to any known communication protocol such as Bluetooth, Zigbee, Wi-Fi, etc., and particularly a BLE signal may be used. The beacon signal output from the beacon terminal 400 may cover an area with a radius of several to tens of meters from the beacon terminal 400.

It is to be noted that, for implementing the technical idea of the present disclosure, the beacon terminal 400 is neither required to be capable of transmitting/receiving signals to/from another beacon terminal, nor required to be capable of performing bi-directional communication with the user terminal 200, in addition to outputting the beacon signal. Further, the beacon terminal 400 is not required to be connected to a separate wired/wireless network to exchange data with the service server 300.

The user terminal 200 may be any known device, which can be carried by a user and includes a microprocessor and an internal memory to perform operation and storage processing, such as a smart phone, a tablet PC, a personal digital assistant (PDA), etc.

The user terminal 200 may include a communication module for receiving a beacon signal, e.g., a Bluetooth communication module, and at least one application or platform provided by the service server 300 or a server of other beacon service providers.

When the user terminal 200 enters the coverage of the beacon terminal 400 and receives a beacon signal, it runs a beacon-related application and then transmits approach information to the service server 300 via a network.

As used herein, the approach information is to notify that the user terminal 200 has received a beacon signal from the beacon terminal 400, and may include identification information of the beacon terminal 400 (e.g., a UUID of the beacon terminal), a time at which the beacon signal is received, and identification information of the user terminal 200.

The identification information of the user terminal 200 may include at least one of an international mobile equipment identifier (IMEI) of the user terminal 200, an E.164 number of a subscriber, and a subscription ID of a beacon application.

The beacon application runs in the background during transmitting the approach information after the beacon signal is received, so that it is transparent to the user. If a push message is received from the service server 300 thereafter, the beacon application runs in the foreground so that contents included in the push message can be provided to the user.

The service server 300 may communicate with several user terminals 200 via the network, receive the approach information from the user terminals 200, and provide a variety of information items accordingly.

For example, the service server 300 may provide a description of a product for sale in the shop where the user terminal 200 is located, an advertising content for the product, and a mileage service in cooperation with a point of sales (POS) in the shop.

Upon receiving contents information, the user terminal 200 may output a reception alarm and contents information in the form of a video signal, an audio signal or vibration.

To this end, the service server 300 may build a database with the approach information received from the user terminal 200, and gather and store a variety of information items such as users' journeys, purchase patterns, preferred items, etc.

Services the service server 300 can provide to the user terminal 200 are not particularly limited, and may include a variety of known services based on the approach information.

Incidentally, since the reception of a beacon signal, the transmission of the approach information, and reception/display of contents are carried out without a user's intervention, contents information may be displayed via the user terminal 200 without any filtering, independently of whether the user wants or not.

Therefore, the user may not want the contents information received when the user terminal is staying at a location, i.e., the contents information provided after a beacon signal from a beacon terminal 400 is recognized.

Hereinafter, an exemplary embodiment of the present disclosure will be described in detail in which contents information are filtered depending on its usefulness. An example in which the user terminal 200 receives contents information and prohibits displaying will be first described, followed by an example in which the service server 300 does not provide contents information to the user terminal 200 if it is determined that the contents information is of low usefulness.

Figure 5:
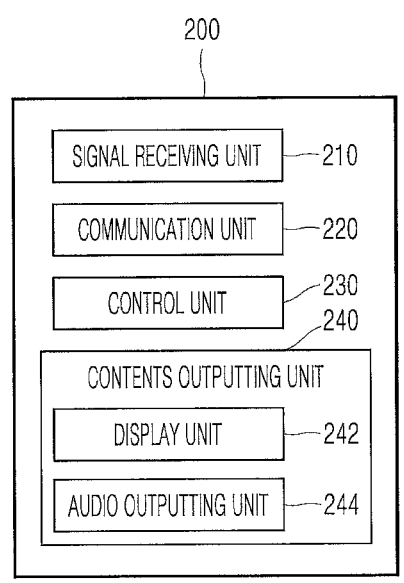
FIG. 5 is a block diagram of a user terminal according to the second exemplary embodiment of the present disclosure.

FIG. 5 is a block diagram of the user terminal 200 according to the second exemplary embodiment of the present disclosure.

As shown in FIG. 5, the user terminal 200 may include a signal receiving unit 210, a communication unit 220, a control unit 230 and an information displaying unit 240. The technical idea of the present disclosure can be implemented even if any of the elements is eliminated or replaced with another element.

The signal receiving unit 210 receives a beacon signal output from the beacon terminal 400. The beacon signal is broadcast within a coverage from the beacon terminal 400 conforming to a wireless communication protocol such as BLE, etc., so that the user terminal 200 may receive the beacon signal as it enters the coverage.

The beacon signal may include identification information of the beacon terminal 400, e.g., a unique user identifier (UUID).

The communication unit 220 may be connected to the service server 300 via a network to transmit/receive a variety of data items to/from the service server 300.

According to the second exemplary embodiment of the present disclosure, the communication unit 220 transmits approach information for the beacon terminal 400 to the service server 300 based on the received beacon signal.

The approach information may include identification information of the beacon terminal 400, a time at which a beacon signal is received, and identification information of the user terminal 200.

Upon receiving the approach information transmitted from the communication unit 220 of the user terminal 200, the service server 300 may extract identification information of the beacon terminal 400 from the approach information to estimate the current location of the user terminal 200.

Then, the service server 300 may transmit contents information associated with the current location of the user terminal 200 to the user terminal 200.

The contents information may include descriptions of products for sale in a store, advertising contents for related products, etc.

The communication unit 220 may receive contents information transmitted from the service server 300.

The information displaying unit 240 may output the contents information received via the communication unit 220 under the control of the control unit 230 to be described below.

The information displaying unit 240 may include a displaying unit 242 for outputting a video signal included in the contents information and an audio outputting unit 244 for outputting an audio signal.

The control unit 230 may include an operation device responsible for overall control over the user terminal 200 and a storage device. According to the second exemplary embodiment of the present disclosure, the control unit 230 determines whether to output the contents received from the service server 300 or not based on a usefulness index.

A usefulness index may be created per identification information of the beacon terminal 400. The control unit 230 may receive a beacon signal from the beacon terminal 400 and then create and update the usefulness indexes, one for every beacon terminal 400, based on a user's operation on the contents information received from the service server 300.

For example, the usefulness indexes may be created and updated by a user's direct evaluation. After displaying the contents information, the control unit 230 controls the displaying unit 242 so that it displays a graphical user interface (GUI) for receiving a user's evaluation on the contents information.

The user may score the contents information depending on how much it is useful for her/him via the GUI. The control unit 230 may increase or decrease the usefulness index of the beacon terminal 400 transmitting the contents information based on the user's evaluation input.

In addition, the usefulness index may be determined depending on a time period for which the contents information is displayed to the user. A long display time of the contents information on the user terminal 200 can be construed as meaning that the contents information meets the user's preference. Accordingly, the control unit 230 may increase the usefulness index if the contents information is displayed for a long period of time, and decrease the usefulness index if the contents information is displayed for a short period of time.

In this regard, since different contents information items may have different playback times, the control unit 230 may use different criterions to determine whether to increase or decrease the usefulness index, taking into account the ratio of a display time to a playback time.

In addition, the usefulness index may be determined depending on whether a user acts as prompted by the contents information after displaying the contents information.

For example, when contents information is output via the displaying unit 242, it is determined that the information is useful to a user if the user accesses to a related website via a link displayed on the displaying unit 242 or pays for a displayed product. Accordingly, the control unit 230 may increase the usefulness index.

The controller unit 230 stores the usefulness indexes by matching them to the identification information of the respective beacon terminals 400. Whenever the contents information is displayed on the user terminal 200, the usefulness indexes may be updated taking into account a user's operation.

In addition, the user terminal 200 provides a feature that enables a user to see the usefulness indexes of beacon terminals stored in the memory, and allows a user to forcibly adjust the usefulness indexes.

After receiving a beacon signal and transmitting approach information, the control unit 230 checks a predetermined usefulness index of the beacon terminal 400 if contents information is received from the service server 300.

Then, if the checked usefulness index is above a predetermined value, the contents information is output via the information displaying unit 240. If the checked usefulness index is below the predetermined value, the received contents information is not output.

A decision whether to output contents information may be made depending on whether a usefulness index is above a criterion value. For example, assuming that the maximum value of the usefulness index is 100, the contents information from any beacon terminal 400 having a usefulness index of 40 or less may be prohibited from being displayed.

As another example, a user may set the criterion value for prohibiting contents information from being displayed.

For example, if a user sets a high criterion value, contents information from any beacon terminal 400 having a usefulness index of, e.g., 60 or less may be prohibited from being displayed. If a user sets a low criterion value, contents information from any beacon terminal 400 having a usefulness index of, e.g., 20 or less may be prohibited from being displayed.

In the foregoing description, a way of managing usefulness indexes and determining whether to output contents information based on the usefulness indexes by the user terminal 200 has been described with reference to FIG. 5. In the following description, a way of managing usefulness indexes and determining whether to output contents information based on the usefulness indexes by the service server 300 will be described with reference to FIG. 6.

Figure 6:
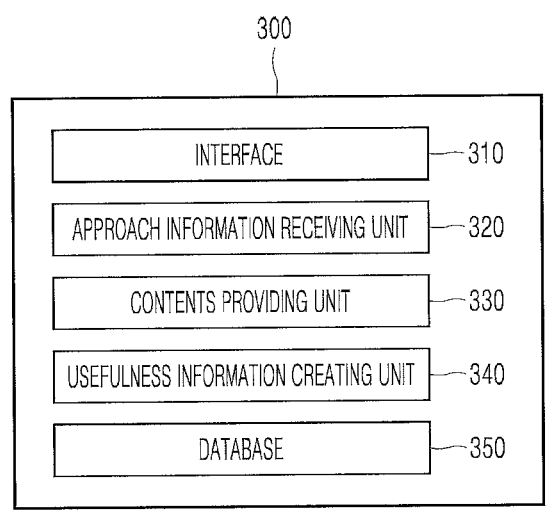
FIG. 6 is a block diagram of a service server according to the second exemplary embodiment of the present disclosure.

FIG. 6 is a block diagram of the service server 300 according to the second exemplary embodiment of the present disclosure.

The description will be made focusing on the configuration of the service server 300 according to the second exemplary embodiment of the present disclosure. The same technical features as those described above with respect to FIG. 5 will not be described again.

As shown in FIG. 6, the service server 300 may include an interface 310, an approach information receiving unit 320, a contents providing unit 330, a usefulness information creating unit 340, and a database 350. The technical idea of the present disclosure can be implemented even if any of the elements is eliminated or replaced with another element.

The interface 310 is to transmit/receive data to/from a plurality of user terminals 200 via a network. The reception of approach information and transmission of contents information may be carried out via the interface 310, as will be described below.

The approach information receiving unit may receive approach information from the user terminal 200. The approach information may include identification information of the beacon terminal 400, a time at which a beacon signal is received, and identification information of the user terminal 200.

The contents providing unit 330 may provide the user terminal 200 with contents information selected based on the approach information.

The contents information may include descriptions of products for sale in a shop, advertising contents of related products, etc.

After providing the contents information, the usefulness information creating unit 340 may create or update a usefulness index of a beacon terminal 400 associated with the approach information based on feedback information received from the user terminal 200.

The feedback information is determined based on a user's operation after the user terminal 200 has output the contents information. An example of the feedback information will be described.

Initially, after displaying contents information, the user terminal 200 may receive a user's evaluation input on the contents information via the GUI, and may create feedback information based on the user's evaluation input to provide it to the service server 300.

The usefulness information creating unit 340 may increase or decrease the usefulness index of the beacon terminal 400 from which the contents information has been transmitted.

In addition, the feedback information may include information on a time period for which contents information is displayed on the user terminal 200. A long display time of the contents information on the user terminal 200 can be construed as meaning that the contents information meets the user's preference. Accordingly, the usefulness information creating unit 340 may increase the usefulness index if the contents information is displayed for a long period of time, and decrease the usefulness index if the contents information is displayed for a short period of time, based on the received feedback information.

In this regard, since different contents information items may have different playback times, the usefulness information creating unit 340 may use different criterions to determine whether to increase or decrease the usefulness index, taking into account the ratio of a display time to a playback time.

In addition, the user terminal 200 may transmit the feedback information to the service server 300 if one of predetermined operations is input by a user after the contents information is output.

For example, if the user accesses to a related website via a link displayed on the displaying unit 242 or pays for a displayed product, it is determined that the information is useful to the user. Accordingly, if such events occur, the user terminal 200 may transmit the feedback information to the service server 300, and the usefulness information creating unit 340 may increase the usefulness index accordingly.

The contents information providing unit 330, when receiving approach information from the user terminal 200, may check a usefulness index matched to the identification information of the beacon terminal 400 that is included in the approach information.

Then, if the checked usefulness index is above a predetermined value, the contents information is transmitted to the user terminal 200 via the contents providing unit 330. If the checked usefulness index is below the predetermined value, the contents information is not transmitted.

A decision whether to transmit contents information may be made depending on whether a usefulness index is above a criterion value. For example, assuming that the maximum value of the usefulness index is 100, the contents information from any beacon terminal 400 having a usefulness index of 40 or less may be prohibited from being transmitted.

As another example, a user may set the criterion value for prohibiting contents information from being displayed via the user terminal 200.

For example, if a user sets a high criterion value, contents information from any beacon terminal 400 having a usefulness index of, e.g., 60 or less may not be transmitted. If a user sets a low criterion value, contents information from any beacon terminal 400 having a usefulness index of, e.g., 20 or less may be prohibited from being transmitted.

Figure 7:
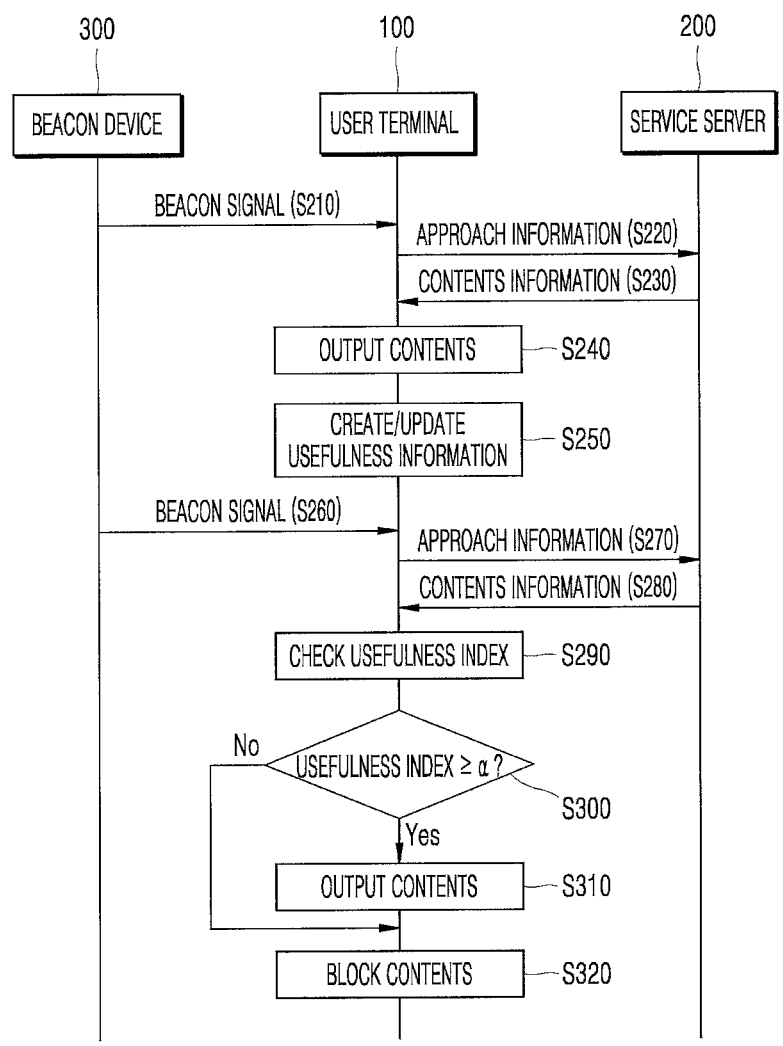
FIGS. 7 and 8 are flowcharts for illustrating a method of filtering contents according to the second exemplary embodiment of the present disclosure.

FIG. 7 is a message flow diagram for illustrating a method of filtering contents according to the second exemplary embodiment of the present disclosure.

Hereinafter, an example of managing usefulness indexes and determining whether to output contents information based on the usefulness indexes by the user terminal 300 will be described with reference to FIG. 7. The same feature as those described above will not be described again to avoid redundancy.

In FIG. 7, steps S210 to S250 include a process that the user terminal 200 outputs contents information and then creates and updates usefulness information based on a user's operation. Steps S260 and S320 include a process that the user terminal 200 determines whether to output the contents information received from the service server 300 based on the usefulness information.

The beacon terminal 400 outputs a beacon signal containing its identification information. The user terminal 200 receives the beacon signal when it approaches the beacon terminal 300 to enter the coverage (S210).

The user terminal 200 transmits approach information for the beacon terminal 400 to the service server 300 based on the received beacon signal (S220). The approach information may include identification information of the beacon terminal 400, a time at which a beacon signal is received, and identification information of the user terminal 200.

Upon receiving the approach information transmitted from the user ten final 200, the service server 300 may extract identification information of the beacon terminal 400 from the approach information to estimate the current location of the user terminal 200.

Then, the service server 300 may transmit contents information associated with the current location of the user terminal 200 to the user terminal 200 (S230).

The user terminal 200 outputs a video or audio signal included in the received contents information (S240).

Then, usefulness information may be created or updated based on a user's operation regarding the output contents information (S250).

For example, the usefulness indexes may be created and updated by a user's direct evaluation.

After displaying the contents information, the user terminal 200 displays a GUI for receiving a user's evaluation on the contents information.

The user may score the contents information depending on how much it is useful for her/him via the GUI. The user terminal 200 may increase or decrease the usefulness index of the beacon terminal 400 transmitting the contents information based on the user's evaluation input.

In addition, the usefulness index may be determined depending on a time period for which the contents information is displayed to the user. A long display time of the contents information on the user terminal 200 can be construed as meaning that the contents information meets the user's preference. Accordingly, the user terminal 200 may increase the usefulness index if the contents information is displayed for a long period of time, and decrease the usefulness index if the contents information is displayed for a short period of time.

In this regard, since different contents information items may have different playback times, the user terminal 200 may use different criterions to determine whether to increase or decrease the usefulness index, taking into account the ratio of a display time to a playback time.

In addition, the usefulness index may be determined depending on whether a user acts as prompted by the contents information after displaying the contents information.

For example, if the user accesses to a related website via a link displayed on the contents information or pays for a displayed product, it is determined that the information is useful to a user. Accordingly, the user terminal 200 may increase the usefulness index.

Hereinafter, a process that the user terminal 200 determines whether to output the contents information received from the service server 300 based on usefulness information.

The user terminal 200 receives a beacon signal (S260), transmits approach information to the service server 300 (S270), and receives contents information from the service server 300 (S280).

Then, the user terminal 200 checks the predetermined usefulness index of the beacon terminal 400 (S290).

The checked usefulness index is compared with a predetermined value a (S300). The contents information is output if the usefulness index is above the predetermined value a (S310), and the contents information is prohibited from being output if the usefulness index is below the predetermined value a (S320).

In this manner, the user terminal 200 may perform filtering and output only useful contents information to the user.

Figure 8:
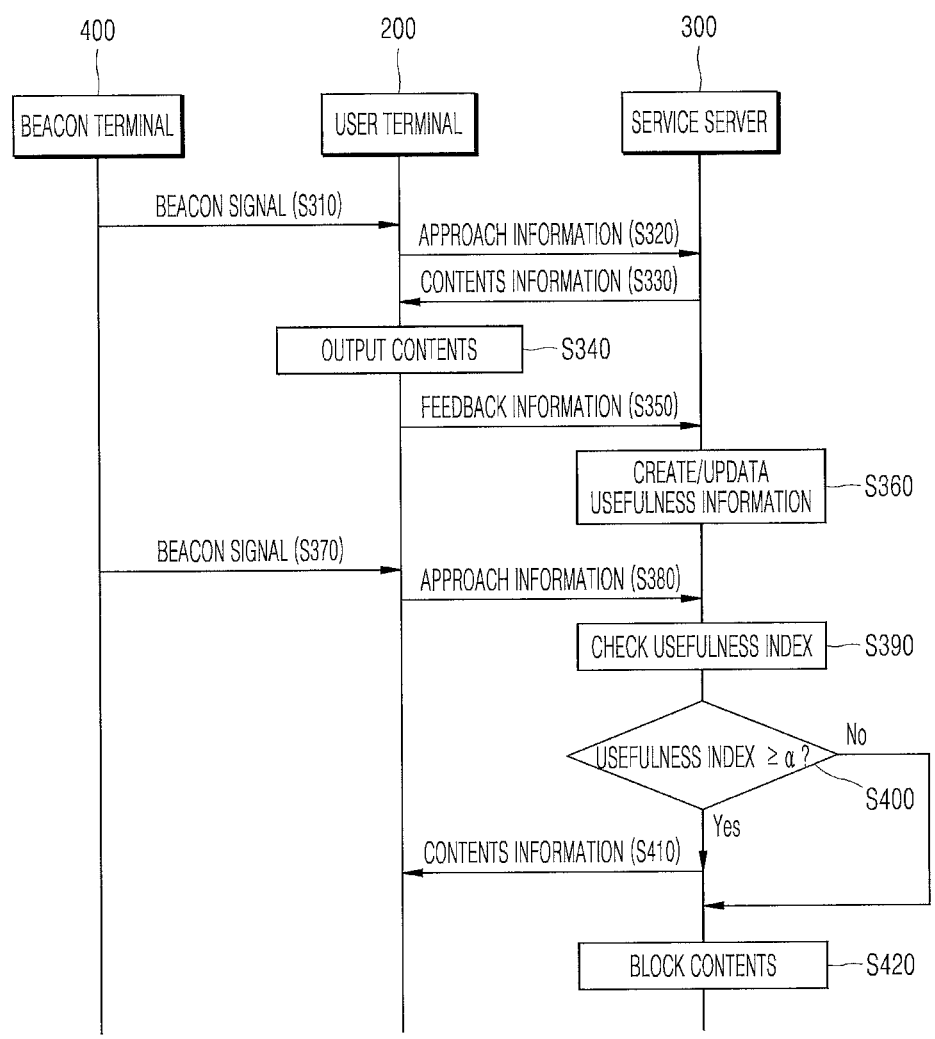

FIG. 8 is a message flow diagram for illustrating another method of filtering contents according to the second exemplary embodiment of the present disclosure.

Hereinafter, an example of managing usefulness indexes and determining whether to transmit contents information to the user terminal 200 based on the usefulness indexes by the service server 300 will be described with reference to FIG. 8. The same feature as those described above will not be described again to avoid redundancy.

The beacon terminal 400 outputs a beacon signal containing its identification information (S310). The user terminal 200 transmits approach information to the service server 300 upon receiving the beacon signal (S320).

The service server 300 selects contents information based on the identification information of the beacon terminal 400 included in the approach information and then transmits it to the user terminal 200 (S330).

The user terminal 200 outputs the contents information (S340), and transmits to the service server 300 feedback information determined based on a user's operation after outputting the contents information (S350).

The user terminal 200 may receive a user's evaluation input on the contents information via the GUI after outputting the provided contents information, and may create feedback information to transmit it to the service server 300. The service server 300 may increase or decrease the usefulness index based on the user's evaluation input.

In addition, the feedback information contains information on a time period for which the contents information is displayed on the user terminal 200. The service server 300 may increase the usefulness index if the time period is long and may decrease the usefulness index if the time period is short.

In addition, the user terminal 200 may transmit the feedback information to the service server 300 if one of predetermined operations (e.g., accessing to a link, paying for a product) is input by the user after the contents information is output. The service server 300 may increase the usefulness index accordingly.

Hereinafter, a process that the service server 300 determines whether to transmit the contents information to the user terminal 200 based on usefulness information.

The user terminal 200 receives a beacon signal (S370), and transmits approach information to the service server 300 (S380).

The service server 300 checks the usefulness index matched to the identification information of the beacon terminal 400 included in the approach information (S390).

Then, if the checked usefulness index is above a predetermined value, the contents information is transmitted to the user terminal 200 (S410). If the checked usefulness index is below the predetermined value, the contents information is prohibited from being transmitted (S420).

In this manner, the user terminal 200 may receive and output only useful contents information to the user depending on a result of filtering by the service server 300.

The second exemplary embodiment of the present disclosure may provide the user terminal, the service server, and the method of filtering contents information, in which for providing a contents service in a beacon service, a user's intention is inferred to determine whether the contents information is useful to a user, and only contents information of high usefulness is displayed on the user terminal.

Hereinafter, a third exemplary embodiment of the present disclosure will be described with Referring to FIGS. 9 to 14, in which a user terminal carried by a user is prompted to output a beacon signal, so that a location-based contents is provided to a nearby user terminal that has recognized the beacon signal.

Figure 9:
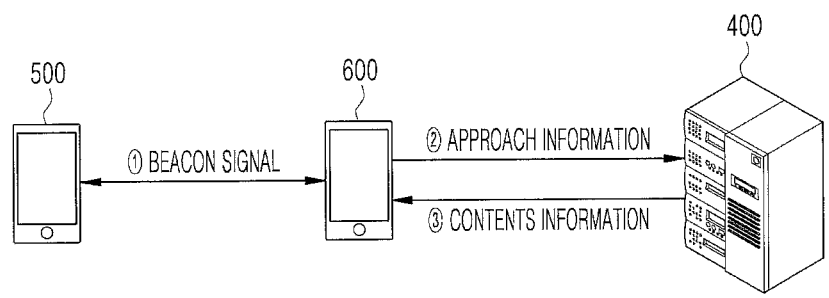
FIG. 9 is a view schematically showing devices of a beacon service system according to a third exemplary embodiment of the present disclosure.

FIG. 9 schematically shows devices of a beacon service system according to the third exemplary embodiment of the present disclosure.

As shown in FIG. 9, the beacon service system may include a service server 400, a beacon terminal 500 and a user terminal 600. A plurality of beacon terminals 500 and a plurality of user terminals 600 may be connected to the single service server 400 via a network. A beacon signal output from a single beacon terminal 500 may be recognized by a plurality of user terminals 600.

The beacon terminal 500 and the user terminal 600 are known devices that can be carried by users and include a microprocessor and an internal memory to install and run applications provided by the service server 400. For example, the beacon terminal 500 and the user terminal 600 may be implemented as smart phones, Tablet PCs, PDAs (personal digital assistants), etc.

In the third exemplary embodiment of the present disclosure, the beacon terminal 500 and the user terminal 600 may be devices of the same kind. In general view of a beacon service, a device that outputs a beacon signal is referred to as the beacon terminal 500, and a device that recognizes the beacon signal and receives contents information from the service server 400 is referred to as the user terminal 600. server 400 is referred to as the user terminal 600.

In some embodiments, one device may function as a beacon terminal or a user terminal, or a beacon terminal 500 may recognize a beacon signal output from another beacon terminal so that the former may also function as a user terminal.

The beacon signal may conform to any known communication protocol such as Bluetooth, Zigbee, Wi-Fi, etc., and a BLE signal based on the Bluetooth Standard 4.0 may be used.

The beacon terminal 500 may broadcast BLE signals in a short range. The beacon signal may cover an area with a radius of several to tens of meters from the beacon terminal 500.

The user terminal 600 may include a communication module for receiving a beacon signal, e.g., a communication module capable of receiving a BLE signal, and at least one application or platform provided by the service server 400 or a server of other beacon service providers for beacon service.

The beacon terminal 500 is one of user terminals that is capable of outputting a beacon signal such as a BLE signal and corresponds to a user terminal subscribed to a beacon output program.

The beacon output program is to enable a beacon terminal 500 carried by a user to emulate a stationary beacon device. A user of the beacon terminal 500 may be connected to the service server 400 to download an application related to the beacon output program and install it to the beacon terminal 500 in advance. The block diagram terminal 500 may output a beacon signal upon receiving a request to output a beacon signal from the service server 400 and may receive a reward for outputting the beacon signal from the service server 400.

The service server 400 corresponds to a server apparatus for integrally managing a beacon service according to the present disclosure. The service server 400 may communicate with a plurality of beacon terminals 500 and user terminals 600 via a network and may build a database with service-related information.

Upon receiving advertisement requests from several shops, the service server 400 may set contents information related to the shops and local information.

In other words, an owner of a shop may request the service server 400 to transmit contents information such as advertisement related to her/his shop, mileage/coupon information, etc., to user terminals 600 located in a particular area. The service server 400 may store the shop information by matching it to each area.

The areas may be sectioned according to geo-fence technology.

The geo-fence technology is to estimate the location information of a user terminal by utilizing combinations of Wi-Fi (wireless lan), GPS (global positioning system) and a base station signal. Although the geo-fence technology may have slightly poor precision, it can cover a wider range of areas.

Figure 10:
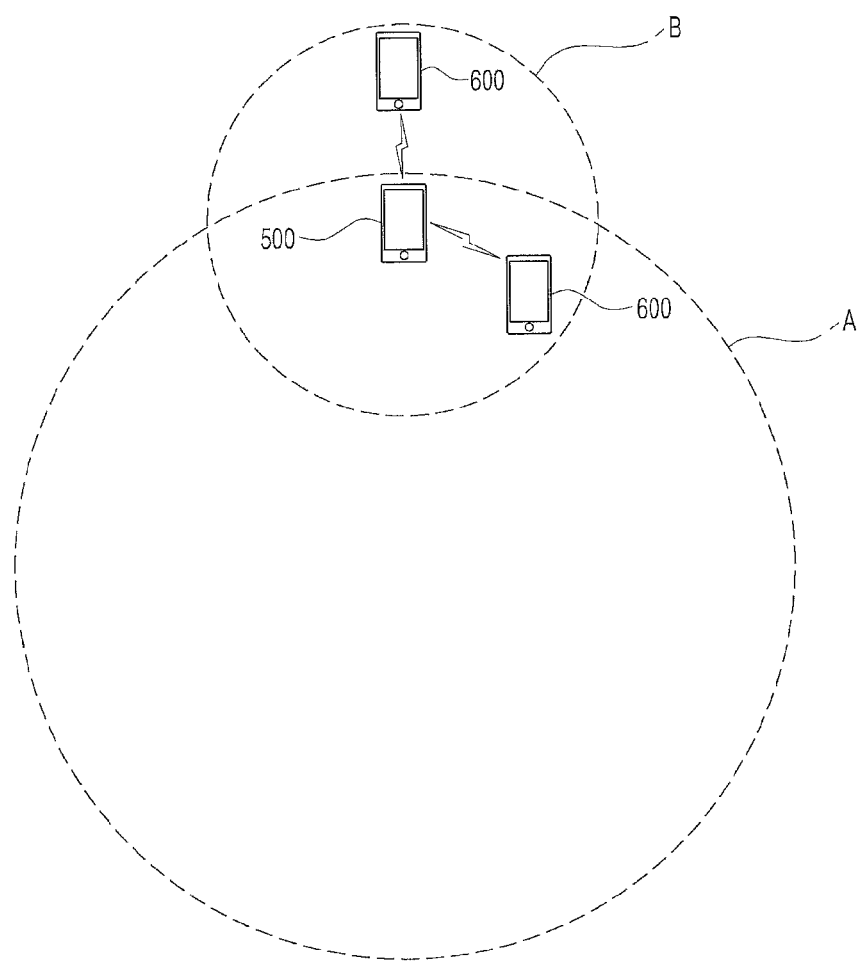
FIG. 10 is a view schematically showing coverages of a geo-fence signal and a beacon signal according to the third exemplary embodiment of the present disclosure.

In FIG. 10, larger circle A refers to an area sectioned according to the geo-fence technology, and smaller circle B refers to the coverage of a beacon signal from a beacon terminal 500.

The service server 400 receives location information from at least one beacon terminal 500 subscribed to the beacon output program based on the geo-fence technology, and checks if the beacon terminal 500 enters particular area A with a radius of several kilometers.

The area A is to provide contents information associated with at least one shop according to a contract made with the owner of the shop. The related information may be stored in the database of the service server 400.

When the beacon terminal 500 enters the area A, the service server 400 transmits a request to output a beacon signal to the beacon terminal 500. In response to this, the beacon terminal 500 outputs a beacon signal.

The beacon signal output from the beacon terminal 500 may be recognized by at least one user terminal 600 located in coverage B. A user terminal 600 that has recognized the beacon signal transmits approach information to the service serve 400.

Upon receiving the approach information from the user terminal 600, the service server 400 extracts at least one of contents information to be transmitted to the user terminal 600 and contents information associated with a shop matched to the area where the beacon terminal 500 is located, and transmits it to the user terminal 600.

In view of providing service, a shop with less population moving around could not provide information associated the shop until potential customers approach the shop. In contrast, according to the present disclosure, it is possible to provide a plurality of user terminals with related contents information by using a beacon signal output from a beacon terminal 500 located in an area with much population even if the user terminal 600 is distant from the shop.

Hereinafter, the configuration of elements according to the third exemplary embodiment of the present disclosure will be described in detail with reference to FIGS. 11 to 14.

Figure 11:
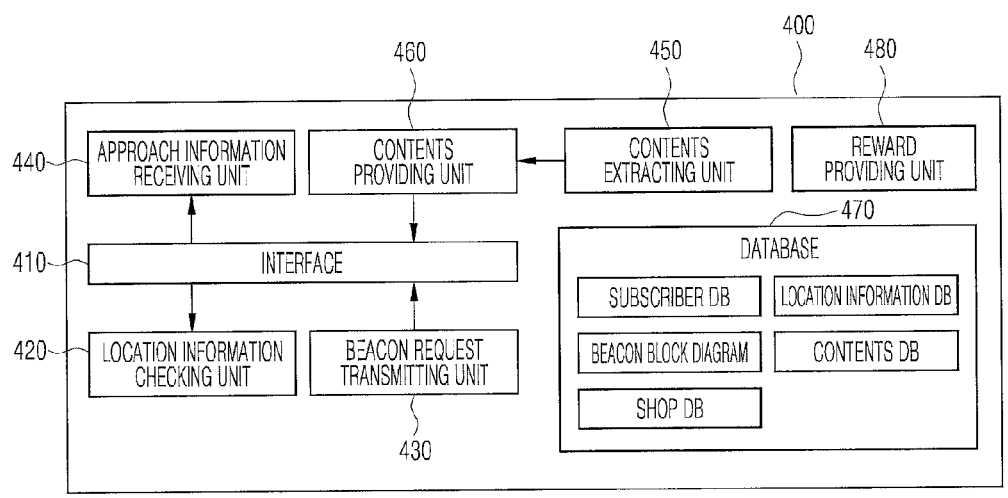
FIG. 11 is a block diagram of a service server according to the third exemplary embodiment of the present disclosure.

FIG. 11 is a block diagram of the service server 400 according to the third exemplary embodiment of the present disclosure.

As shown in FIG. 6, the service server 400 may include an interface 410, a location information checking unit 420, a beacon request transmitting unit 430, an approach information receiving unit 440, a contents extracting unit 450, a contents providing unit 460, a database 470, and a reward providing unit 480. The technical idea of the present disclosure can be implemented even though any of the elements is eliminated or replaced with another element.

The interface 410 is to transmit/receive data to/from a plurality of beacon terminals 500 and user terminals 600 via any known network. In the following descriptions, data sent from the service serve 400 to the beacon terminal 500 or the user terminal 600, and data received from the beacon terminal 500 or the user terminal 600 may be transmitted/received via the interface 410, unless specifically stated otherwise.

The database 470 may store various types of data items related to a beacon service and may include at least a subscriber DB, a beacon DB, a shop DB, a location information DB and a contents DB.

The subscriber DB stores identification information of a user terminal 600 subscribed to a beacon service, i.e., application ID, identification information of the user terminal 600 (MDN, etc.), personal information such as users' age. Further, the subscriber DB stores various types of data items including contents information transmitted to the subscriber DB in advance and users' reaction for the contents information (e.g., a time period in which the contents information is displayed, access to an external link, purchase a product, etc.).

The beacon DB stores identification information of a beacon terminal 500 subscribed to the beacon output program (application ID, MDN, etc.), and information regarding a reward provided for outputting a beacon signal, etc. Further, the beacon DB may store a time zone in which a user of a beacon terminal 500 wants to output a beacon signal input via an application, a time at which a beacon signal is output when a user enters each area.

The shop DB stores information regarding shops that want to display contents information associated with the shops by matching it to location information regarding where the shops want to display the contents information.

The location information DB may store information related to areas sectioned according to the geo-fence technology and information related to a time at which each of beacon terminals 500 enters and leaves the areas to accumulate them. The contents DB may store a variety of contents information times provided from shops.

The location information checking unit 420 may receive location information from the beacon terminal 500 and may check the location information of the beacon terminal 500 using the geo-fence technology.

The geo-fence technology is to estimate the location information of a user terminal by utilizing combinations of Wi-Fi (wireless lan), GPS (global positioning system) and a base station signal. By using the geo-technology, the service server 400 may locate the beacon terminal 500 in several sections in an area with a radius of several kilometers.

Once the location information of the beacon terminal 500 is checked, the location information checking unit 420 may check if the beacon terminal 500 enters one of predetermined areas.

As described above, the service server 400 checks the location information of the beacon terminal 500 subscribed to the beacon output program in advance, and may check if the beacon terminal 500 enters one of the predetermined areas that provides contents information associated with a shop according to a contract made with the owner of the shop.

If it is checked that the beacon terminal 500 enters one of the predetermined areas, the beacon request transmitting unit 430 transmits a request to output a beacon signal to have the beacon terminal 500 to output a beacon signal in a short range.

The beacon request transmitting unit 430 checks if there is shop information matched to the area that the beacon terminal 500 has entered based on a result of the location information checking unit 420, and may transmit a request to output a beacon signal to the beacon terminal 500 if so.

Upon receiving the request to output a beacon signal, the beacon terminal 500 may run an already-installed application in the background without any operation by a user, and may enable a beacon signal output module (not shown) to output a beacon signal.

The beacon request transmitting unit 430 may transmit shop information matched to the area to the beacon terminal 500. The beacon signal output from the beacon terminal 500 may include at least one of identification information of the beacon terminal 500, information on the area where the beacon terminal 500 is located, and the shop information received from the service server 400.

That is, the beacon signal may include information for estimating the current location of the user terminal 600 having recognized the beacon signal or shop information having provided contents information matched to the location.

When the user terminal 600 recognizes the beacon signal output from the beacon terminal 500, it transmits approach information to the service serve 400 via a beacon service application. The approach information receiving unit 440 receives the approach information.

The approach information may include identification information of the user terminal 600, the identification information of beacon terminal 500 that has output the recognized beacon signal or identification information of the area where the beacon terminal 500 is located.

The contents extracting unit 450 extracts contents information to be transmitted to the user terminal 600 among a plurality of contents stored in the contents DB of the database 470 based on the received approach information.

The contents extracting unit 450 checks a beacon terminal 500 located at which area the user terminal 600 is adjacent to, based on the received approach information, and extracts contents information matched to the area from the contents DB. As described above, the shop DB and the location information DB of the database 470 store information regarding areas where the shops want to display contents information. The contents extracting unit 450 may extract at least one content based on the information of the database 470 and the approach information.

If the approach information includes shop information, the contents extracting unit 450 may extract contents information matched to the shop information.

The contents providing unit 460 may provide extracted contents information to the user terminal 600 having transmitted the approach information via a network.

The contents information may include descriptions of products for sale in a store, advertising contents of related products, etc.

The reward providing unit 480 provides a predetermined reward to the beacon terminal 500 that has output a beacon signal.

The reward is given for outputting a beacon signal and may include on-line contents such as coupon/mileage provided from the service server 400.

If a beacon terminal 500 sends out a beacon signal for more than a predetermined time period, if a user terminal 600 receives contents information and displays the contents information for more than a predetermined time period, or if a user uses a coupon included in the contents information and so on, the reward providing unit 480 may provide a reward to the beacon terminal 500 associated with the contents information.

According to the third exemplary embodiment of the present disclosure, a beacon terminal 500 carried by a user is prompted to output a beacon signal, and if a nearby user terminal 600 recognizes the beacon signal, the user terminal 600 may be provided with location-based contents. As a result, an owner of a shop has an advantage in that no beacon device is required to be installed in the shop, and beacon signals can reach more broadly.

Figure 12:
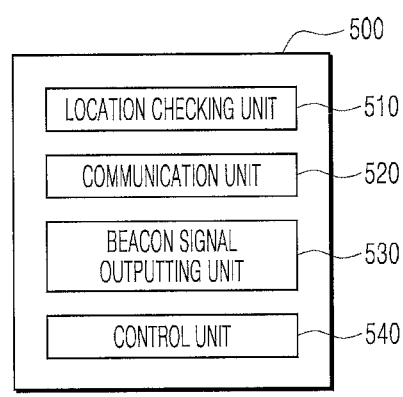
FIG. 12 is a block diagram of a beacon terminal according to the third exemplary embodiment of the present disclosure.

FIG. 12 is a block diagram of the beacon terminal 500 according to the third exemplary embodiment of the present disclosure.

As shown in FIG. 12, the beacon terminal 500 may include a location checking unit 510, a communication unit 520, a beacon signal outputting unit 530, and a control unit 540. The technical idea of the present disclosure can be implemented even though any one of the elements is eliminated or replaced with another element.

As described above, the beacon terminal 500 and the user terminal 600 may be devices of the same kind. As used herein, in general view of a beacon service, a device that outputs a beacon signal is referred to as the beacon terminal 500, and a device that recognizes the beacon signal and receives contents information from the service server 400 is referred to as the user terminal 600. server 400 is referred to as the user terminal 600.

The beacon terminal 300 may be implemented as a smart phone, a tablet PC, a personal digital assistants (PDA), etc. Hereinafter, descriptions will be made focusing on the configuration of the beacon terminal 500 for outputting a beacon signal.

The location checking unit 510 checks the current location information of the beacon terminal 500 using the geo-fence technology.

The communication unit 520 connects to a known network such as a wireless LAN and a mobile communication network and transmits/receives a variety of data items to/from the service server 300.

The communication unit 520 may transmit location information checked by the location checking unit 510 and identification information of the beacon terminal 500 to the service server 400, and may receive a request to output a beacon signal transmitted from the service server 400.

The beacon signal outputting unit 530 is to output a beacon signal in a short range. As described above, a BLE signal based on Bluetooth 4.0 standard may be used as a beacon signal. The beacon signal outputting unit 530 may broadcast a beacon signal in a coverage of several to tens of meters.

The control unit 540 may be implemented as an operation/processing device such as an AP (application processor), CPU (central processing unit), etc., that is responsible for overall operation of the beacon terminal 500. The control unit 540 may run an already-installed application for providing a beacon service, and may control the beacon signal outputting unit 530 so that it outputs a beacon signal.

If a request to output a beacon signal is received via the communication unit 520, the control unit 540 controls the beacon signal outputting unit 530 so that it outputs a beacon signal.

The service server 400 may determine which of predetermined areas the beacon terminal 500 enters based on the location information received from the beacon terminal 500, and may transmit a request to output a beacon signal to the beacon terminal 500 if the beacon terminal 500 enters an area.

The request to output a beacon signal may include shop information matched to the area where the beacon terminal 500 has entered. The received shop information is cached by the beacon terminal 500 during an expiration time period set by an owner of the shop, and may be used when the beacon terminal 500 enters the same area later on.

Upon receiving a request to output a beacon signal, the control unit 540 runs an already-installed application for outputting a beacon signal, checks if the beacon signal outputting unit 530 is enabled, and, if it is disabled, enables the beacon signal outputting unit 530 automatically without any operation by a user to output a beacon signal.

Without any operation by the user of the beacon terminal 500, the already-installed application runs in t background, f the beacon signal outputting unit 530 is enabled to output a beacon signal.

The beacon signal output from the beacon signal outputting unit 530 may include at least one of identification information of the beacon terminal 500, information regarding the area where the beacon terminal 500 is located, and shop information received from the service server 400. The user terminal 600 located in the coverage of the beacon signal can recognize the beacon signal.

If the beacon terminal 500 leaves the area where it has entered, the control unit 540 may control the beacon signal outputting unit 503 so that it stops outputting the beacon signal.

The user of the beacon terminal 500 may set a time period for which the beacon signal is output. The control unit 540 may control the beacon signal outputting unit 503 so that it stops outputting the beacon signal after a predetermined time period.

After outputting the beacon signal is completed, the beacon terminal 500 may receive a predetermined reward from the service serve 400 (S670).

Figure 13:
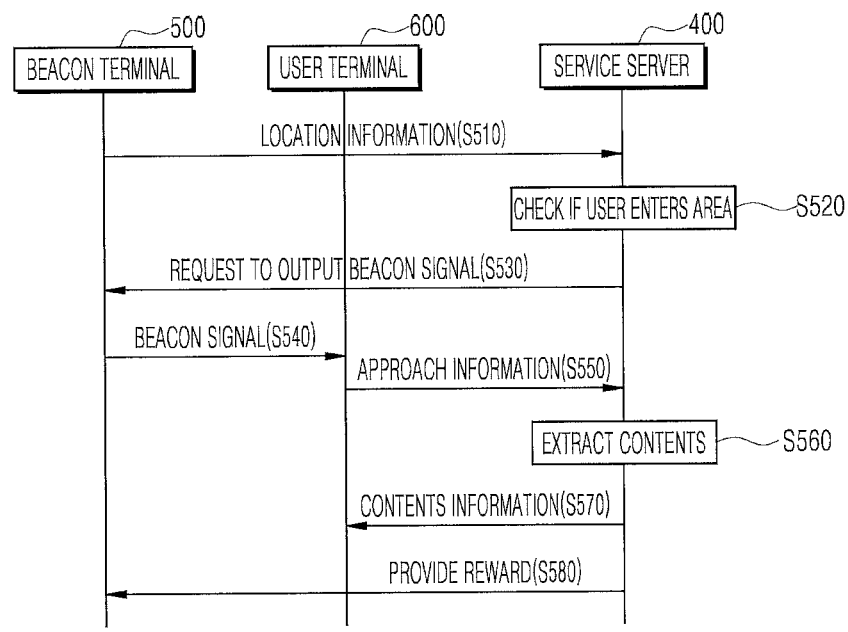
FIG. 13 is a flowchart illustrating a contents service method according to the third exemplary embodiment of the present disclosure.

FIG. 13 is a message flow diagram for illustrating a method of contents service according to the third exemplary embodiment of the present disclosure.

The service server 400 checks the location information of the beacon terminal 500 (S510). In dosing so, the geo-fence technology may be used that estimates the location information of the user terminal 600 by utilizing combinations of Wi-Fi (wireless lan), GPS (global positioning system) and a base station signal.

The service server 400 checks if the beacon terminal 500 enters one of predetermined areas (S520).

The service server 400 checks the location information of the beacon terminal 500 subscribed to the beacon output program in advance, and may check if the beacon terminal 500 enters one of the predetermined areas that provides contents information associated with a shop according to a contract made with the owner of the shop.

If the beacon terminal 500 enters one of the predetermined areas, the service server 400 transmits a request to output a beacon signal to the beacon terminal 500 (S530).

At this time, the service server may transmit shop information matched to the area where the beacon terminal 500 is located to the beacon terminal 500.

The beacon terminal 500 receives the request to output a beacon signal and output a beacon signal in a short range (S540).

The beacon signal may include at least one of identification information of the beacon terminal 500, information regarding the area where the beacon terminal 500 is located, and shop information received from the service server 400.

That is, the beacon signal may include information for estimating the current location of the user terminal 600 having recognized the beacon signal or shop information having provided contents information matched to the location.

The user terminal 600, which is located in the coverage of the beacon signal output fro the beacon terminal 500, recognizes the beacon signal, and transmits approach information to the service serve 400 via a beacon service application.

The approach information may include at least one of identification information of the beacon terminal 500 included in the beacon signal, information regarding the area where the beacon terminal 500 is located and shop information received from the service server 400, and identification information of the user terminal 600.

Upon receiving the approach information, the service server 400 extracts contents information to be transmitted to the user terminal 600 among a plurality of contents stored in the database based on the received approach information (S560).

The service server 400 checks a beacon terminal 500 located at which area the user terminal 600 is adjacent to, based on the received approach information, and extracts contents information matched to the area from the database.

As described above, the shop DB and the location information DB included in the database of the service server 400 store information regarding areas where the shops want to display contents information. The service server 400 may extract at least one content based on the information of the database 470 and the approach information.

If the approach information includes shop information, the contents extracting unit 450 may extract contents information matched to the shop information.

The service server 400 provides the extracted contents information to the user terminal 600, and the user terminal 600 outputs the contents information.

Then, the service server 400 provides a predetermined reward to the beacon terminal 500 that has output a beacon signal (S580).

The reward is given for outputting a beacon signal and may include on-line contents such as coupon/mileage provided from the service server 400.

Figure 14:
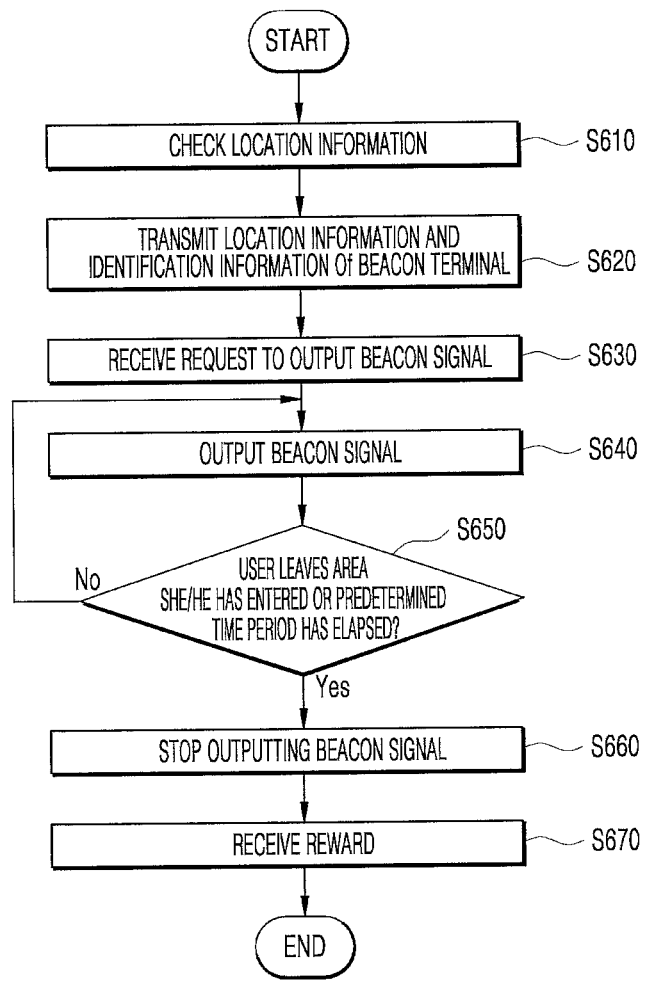
FIG. 14 is a flowchart for illustrating a method of controlling a beacon terminal according to the third exemplary embodiment of the present disclosure.

FIG. 14 is a flowchart for illustrating a method of controlling the beacon terminal 500 according to the third exemplary embodiment of the present disclosure.

The operation of the beacon terminal 500 will be described below briefly. The technical features already described above will not be described again.

The beacon terminal 500 checks the current location information of the beacon terminal 500 using geo-fence technology.

Once the location information is obtained, the location information and the identification information of the beacon terminal 50 is transmitted to the service server 400 (S620).

Then, upon receiving a request to output a beacon signal from the service server 400 (S630), the beacon terminal 500 broadcasts a beacon signal in a short range (S640).

If the beacon terminal 500 leaves the current area or a predetermined time period elapses after outputting a beacon signal (S650), the beacon terminal 500 stops outputting the beacon signal (S660).

Then, the beacon terminal 500 may receive a reward from the service server 400 (S670).

According to the third exemplary embodiment of the present disclosure, a user terminal carried by a user is prompted to output a beacon signal, and if a nearby user terminal recognizes the beacon signal, the user terminal can be provided with location-based contents. In this manner, no additional beacon device is required to be installed in a shop, so that an owner of the shop can save cost for maintenance. Further, it is possible to provide beacon-aware contents information to potential customers who do not visit the shop. In addition, a user of the beacon terminal can receive a reward for outputting a beacon signal.

The steps of methods or algorithms described with respect to the embodiments may be performed by hardware or by a software module executed by a processor, or by a combination thereof. The software module may be resident on a RAM, a flash memory, a ROM, an EPROM, an EEPROM, registers, a hard disk, a removable disk, a CD-ROM or any storage medium known in the art. The storage medium is connected to a processor and the processor reads out information from the storage medium and write information into the storage medium. Alternatively, the storage medium may be integrated with the processor. The processor and the storage medium may be incorporated into an ASIC. The ASIC may be incorporated into a terminal. Alternatively, the processor and the storage medium may be incorporated into a terminal as separate components.

Although the exemplary embodiments of the present disclosure have been described illustrative purposes, those skilled in the art will appreciate that various modifications, additions and substitutions are possible, without departing from the scope of the disclosure as defined by the appended claims. Accordingly, such modifications, additions and substitutions should also be understood to fall within the scope of the present disclosure.

What is claimed is:

1. A user terminal comprising:
   one or more processors;
   a signal receiving unit executable by the one or more processors configured to receive a plurality of beacon signals, each of the plurality of beacon signal including identification information of a premise;
   a signal selecting unit executable by the one or more processors configured to select one of the plurality of beacon signals based on signal intensities of the plurality of beacon signals;
   a control unit executable by the one or more processors configured to determine contents information to be presented responsive to a usefulness index of the contents information exceeding a criterion value set by at least a user of the user terminal, the contents information associated with a premise located with a beacon terminal of the selected beacon signal, wherein the usefulness index is determined based on (i) a length of time period during which the contents information was previously presented to the user and (ii) whether the user previously took an action prompted by the contents information after previously being presented with the contents information; and
   an information display configured to present the contents information determined for presentation by the control unit to the user.

2. The user terminal of claim 1, wherein the selected beacon signal includes:
   a first beacon signal used for checking entry of the user into the premise based on intensity of the first beacon signal, and a second beacon signal containing identification information of the premise.

3. The user terminal of claim 2, wherein the first beacon signal and the second beacon signal differ in frequencies.

4. The user terminal of claim 1, further comprising:
   a communication unit executable by the one or more processors configured to transmit approach information indicating the beacon terminal sending out the selected beacon signal to a service server, and receive the contents information corresponding to the approach information from the service server.

5. The user terminal of claim 1, wherein the selected beacon signal has a minor field set to zero.

6. The user terminal of claim 1, wherein the user terminal and the beacon terminal are portable devices.

7. The user terminal of claim 1, wherein the action prompted by the contents information is electing a link displayed on the information display.

8. The user terminal of claim 1, wherein the control unit causes the usefulness index to be updated based on input from the user.

9. The user terminal of claim 1, wherein the control unit s configured to display the usefulness index on the information display.

10. The user terminal of claim 9, wherein the control unit is configured to update the usefulness index responsive to receiving input from the user to change the usefulness index after displaying the usefulness index on the information display.

11. The user terminal of claim 1, wherein the control unit is configured to increase the usefulness index responsive to the contents information presented to the user is above a predetermined amount of time, and decrease the usefulness index responsive to the contents information presented to the user is below the predetermined amount of time.

12. The user terminal of claim 1, wherein the control unit is configured to increase or decrease the usefulness index based on a ratio of a display time of the contents information to a playback time of the contents information.

13. A method of operating a user terminal, the method comprising:
   receiving a plurality of beacon signals at the user terminal, each of the plurality of beacon signals including identification information of a premise;
   selecting, by the user terminal, one of the plurality of beacon signals based on signal intensities of the plurality of beacon signals;
   determining, by the user terminal, contents information to be presented responsive to a usefulness index of the contents information exceeding a criterion value set by at least a user of the user terminal, the contents information associated with a premise located with a beacon terminal of the selected beacon signal, wherein the usefulness index is determined based on (i) a length of time period during which the contents information was previously presented to the user and (ii) whether the user previously took an action prompted by the contents information after previously being presented with the contents information; and
   presenting, by the user terminal, the contents information determined for presentation to the user.

14. The method of claim 13, wherein the selected beacon signal includes:
   a first beacon signal used for checking entry of the user into the premise based on intensity of the first beacon signal, and a second beacon signal containing identification information of the premise.

15. The method of claim 13, further comprising:

transmitting, by the user terminal, approach information indicating the beacon terminal sending out the selected beacon signal to a service server, and receiving the contents information at the user terminal, the contents information created based on the approach information from the service server.

* * * * *